United States Patent
Gan et al.

(10) Patent No.: US 11,996,555 B2
(45) Date of Patent: May 28, 2024

(54) TERNARY CATHODE MATERIAL, PREPARATION METHOD THEREFOR, AND LITHIUM ION BATTERY

(71) Applicant: BYD COMPANY LIMITED, Guangdong (CN)

(72) Inventors: Yongqing Gan, Shenzhen (CN); Shicai Li, Shenzhen (CN); Dongjie Hu, Shenzhen (CN); Xiao Shi, Shenzhen (CN); Wei Song, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 553 days.

(21) Appl. No.: 17/272,177

(22) PCT Filed: Aug. 28, 2019

(86) PCT No.: PCT/CN2019/103089
§ 371 (c)(1),
(2) Date: Feb. 26, 2021

(87) PCT Pub. No.: WO2020/043135
PCT Pub. Date: Mar. 5, 2020

(65) Prior Publication Data
US 2021/0367233 A1    Nov. 25, 2021

(30) Foreign Application Priority Data

Aug. 28, 2018 (CN) .......................... 201810990236.2

(51) Int. Cl.
*H01M 4/505* (2010.01)
*H01M 4/02* (2006.01)
*H01M 4/36* (2006.01)
*H01M 4/525* (2010.01)
*H01M 4/62* (2006.01)
*H01M 10/0525* (2010.01)

(52) U.S. Cl.
CPC ............ *H01M 4/505* (2013.01); *H01M 4/366* (2013.01); *H01M 4/525* (2013.01); *H01M 4/62* (2013.01);
(Continued)

(58) Field of Classification Search
CPC .......................... C01G 53/50; C01G 2002/72; C01G 2004/03; C01G 2004/61; C01G 2004/84;
(Continued)

(56) References Cited

U.S. PATENT DOCUMENTS

2009/0011333 A1*  1/2009  Wakita .................. H01M 4/136
                                                                                      429/220
2009/0068561 A1   3/2009  Sun et al.
(Continued)

FOREIGN PATENT DOCUMENTS

CN    101997113 A    3/2011
CN    103367704 A    10/2013
(Continued)

OTHER PUBLICATIONS

International Search Report and Written Opinion for Application No. PCT/CN2019/103089, dated Nov. 29, 2019, 9 pages.

*Primary Examiner* — Scott J. Chmielecki (57) ABSTRACT

A ternary cathode material, a preparation method thereof, and a lithium ion battery are provided. The ternary cathode material comprises a micron-sized single-crystalline particle structure of $LiNi_{1-x-y-z}Co_xMn_yM_zO_2$, wherein $0.6<1-x-y-z<1.0$, $0<x<0.2$, $0<y<0.3$, and $0<z<0.1$; and the single-crystalline particle structure comprises a central area and surface layer area, wherein the molar ratio of elements in the central area meets $Ni:Co:Mn:M=a1:x1:y1:z1$, and the molar ratio of elements in the surface layer area meets $Ni:Co:Mn:M=a2:x2:y2:z2$, in which $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2$, $y2 \leq 0.4$, and
(Continued)

$0 \leq z2 \leq 0.05$, provided that z1 and z2 are not simultaneously zero, and $a1/(a1+x1+y1+z1) > a2/(a2+x2+y2+z2)$; and M comprises at least one selected from Al, Mg, Ti, Ga, Nb, Zr, W, Mo and Ta.

20 Claims, 3 Drawing Sheets

(52) U.S. Cl.
CPC .. *H01M 10/0525* (2013.01); *H01M 2004/028* (2013.01)

(58) Field of Classification Search
CPC .. C01G 2006/40; H01M 4/131; H01M 4/366; H01M 4/505; H01M 4/525
See application file for complete search history.

(56) References Cited

U.S. PATENT DOCUMENTS

| | | | |
|---|---|---|---|
| 2015/0072240 A1* | 3/2015 | Yoo | C01B 33/037 216/13 |
| 2015/0125745 A1* | 5/2015 | Kaneda | H01M 4/13 427/58 |
| 2016/0156038 A1* | 6/2016 | Park | H01M 4/622 429/217 |
| 2018/0062173 A1* | 3/2018 | Jo | C01G 51/42 |
| 2018/0183046 A1 | 6/2018 | Jin et al. | |
| 2018/0233739 A1 | 8/2018 | Park et al. | |
| 2018/0287141 A1* | 10/2018 | Kurita | H01M 4/587 |
| 2019/0131651 A1* | 5/2019 | Park | H01M 10/0525 |
| 2019/0148711 A1* | 5/2019 | Jo | C01G 51/006 429/231.95 |
| 2020/0235373 A1* | 7/2020 | Tanaka | H01M 50/414 |

FOREIGN PATENT DOCUMENTS

| | | |
|---|---|---|
| CN | 104347865 A | 2/2015 |
| CN | 104409716 A | 3/2015 |
| CN | 105322152 A | 2/2016 |
| CN | 105609759 A | 5/2016 |
| CN | 106159251 A | 11/2016 |
| CN | 108023078 A | 5/2018 |
| CN | 108221051 A | 6/2018 |
| CN | 108298599 A | 7/2018 |
| KR | 20180059736 A | 6/2018 |

* cited by examiner

TERNARY CATHODE MATERIAL, PREPARATION METHOD THEREFOR, AND LITHIUM ION BATTERY

CROSS-REFERENCE TO RELATED APPLICATIONS

This application is a national phase application of International Patent Application No. PCT/CN2019/103089, filed with the China National Intellectual Property Administration (CNIPA) on Aug. 28, 2019, which is based on and claims the priority to and benefits of Chinese Patent Application No. 201810990236.2 filed on Aug. 28, 2018 with the CNIPA. The content of all of the above applications is incorporated herein by reference in their entirety.

FIELD

This application relates to the field of battery materials, and in particular, to a ternary cathode material, a preparation method thereof, and a lithium ion battery.

BACKGROUND

The cathode material of power batteries (such as lithium ion batteries) is a key factor determining their performance. At present, the ternary cathode material of secondary spherical structure (for example, ternary nickel cobalt manganese (NCM) or nickel cobalt aluminum (NCA) material) is a widely used cathode material for power batteries. This ternary cathode material with a secondary spherical structure formed by agglomeration of primary particles still has some shortcomings. For example, in a first aspect, the intrinsic structural strength of the ternary cathode material with a secondary spherical structure is low, and the secondary spherical structure trends to break at a higher compaction density to expose the internal particles that are brought into contact and prone to side reactions with the electrolyte, causing the dissolution of transition metals, deteriorated cycle performance, and many other problems. In a second aspect, the cathode material of secondary spherical structure has a rough surface, which may cause locally uneven charging and discharging current during the charging and discharging process, causing local overcharge or overdischarge of the cathode material. As a result, the uniformity of the single batteries in the power battery pack become worse, which in turn affects the cycle life of the battery. In a third aspect, the ternary cathode material of secondary spherical structure, especially the ternary cathode material with a high nickel content, has a high surface pH, which not only makes the mixed slurry easy to be gelatinized, but also easily causes the problems of high-temperature expansion or expansion upon storage.

To solve the above technical problems of the ternary cathode material of secondary spherical structure, a ternary cathode material with a single-crystalline particle structure has received more and more attention. The cathode material of a single-crystalline particle structure has high structural strength, which can effectively increase the compaction density of the cathode plate; and has smooth surface, small specific surface area, and small contact area with the electrolyte, which can effectively reduce the occurrence of side reactions. In addition, the cathode material of single-crystalline morphology has a low surface pH value, which can effectively solve problems such as expansion. However, this cathode material of the single-crystalline particle structure has problems such as low discharge capacity and poor rate performance.

SUMMARY

A first aspect of the present application provides a ternary cathode material, which comprises a micron-sized single-crystalline particle structure of $LiNi_{1-x-y-z}Co_xMn_yM_zO_2$, where $0.6 \leq 1-x-y-z<1.0$, $0<x<0.2$, $0<y<0.3$, and $0<z<0.1$. The single-crystalline particle structure comprises a central area and a surface layer area, where the molar ratio of elements in the central area meets $Ni:Co:Mn:M=a1:x1:y1:z1$, and the molar ratio of elements in the surface layer area meets $Ni:Co:Mn:M=a2:x2:y2:z2$, in which $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, provided that z1 and z2 are not simultaneously zero, and $a1/(a1+x1+y1+z1)>a2/(a2+x2+y2+z2)$; and M comprises at least one selected from Al, Mg, Ti, Ga, Nb, Zr, W, Mo and Ta.

A second aspect of the present application provides a method for preparing a ternary cathode material, which comprises the following steps:

formulating a nickel source, a cobalt source, a manganese source, and an M source into a solution A in a first container according to the stoichiometric ratio $Ni:Co:Mn:M=a1:x1:y1:z1$, and formulating the nickel source, the cobalt source, the manganese source and the M source into a solution B in a second container according to the stoichiometric ratio $Ni:Co:Mn:M=a2:x2:y2:z2$, where $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, provided that z1 and z2 are not simultaneously zero, and $a1/(a1+x1+y1+z1)>a2/(a2+x2+y2+z2)$; and the M source comprises at least one selected from soluble salts of Al, Mg, Ti, Ga, Nb, Zr, W, Mo and Ta;

pumping the solution A into a reactor containing an alkali solution and undergoing a first co-precipitation reaction; and after the first co-precipitation reaction is completed, pumping the solution B into the reactor containing the alkali solution and undergoing a second co-precipitation reaction to prepare a precursor material;

mixing the precursor material with a lithium salt, pre-sintering, and pulverizing to obtain a first material;

mixing the first material with a flux, subjecting the material to a primary sintering, pulverizing, washing to remove the flux and drying to obtain a second material; and subjecting the second material to a secondary sintering, cooling, and pulverization to obtain a ternary cathode material of single-crystalline particle structure.

A third aspect of the present application provides a lithium ion battery, which comprises a battery cell, an electrolyte, and a battery casing that accommodates the battery cell and the electrolyte. The battery cell comprises a cathode, a separator, and an anode. The cathode comprises a cathode current collector and a cathode material layer located on the surface of the cathode current collector, where the cathode material layer comprises a cathode active material, a conductive agent, and a binder, and the cathode active material is the ternary cathode material described above.

By means of the above technical solutions, the ternary cathode material of the present application has a higher compaction density and upper-limit voltage, can reduce the occurrence of side reactions, and can solve the problems of high-temperature expansion and expansion upon storage of the battery. Moreover, in the ternary cathode material of the present application, the content of nickel in the single-crystalline particle structure is greater than that in the surface layer, which can inhibit the phase transition (oxygen evolution reaction) of the high nickel material in a high lithium deintercalation state, thereby improving the overall cycle performance of the battery.

DETAILED DESCRIPTION

Embodiments of this application are described in detail below, and examples of the embodiments are shown in the accompanying drawings, where the same or similar elements and the elements having same or similar functions are denoted by the same or similar reference numerals throughout the descriptions. The embodiments described below with reference to the accompanying drawings are exemplary and used for explaining this application, and should not be construed as a limitation on this application.

The endpoints and any values of the ranges disclosed herein are not limited to the precise range or value, and these ranges or values should be understood to include values close to these ranges or values. A numerical range between endpoint values of each range, a numerical range between an endpoint value and an individual point value of each range, and a numerical range between individual point values may be combined with each other to obtain one or more new numerical ranges, and such numerical ranges should be considered to be specifically disclosed herein.

In a first aspect of the present application, the present application provides a ternary cathode material, which comprises a micron-sized single-crystalline particle structure of $LiNi_{1-x-y-z}Co_xMn_yM_zO_2$, where $0.6<1-x-y-z<1.0$, $0<x<0.2$, $0<y<0.3$, and $0<z<0.1$. The single-crystalline particle structure comprises a central area and a surface layer area, where the molar ratio of elements in the central area meets $Ni:Co:Mn:M=a1:x1:y1:z1$, and the molar ratio of elements in the surface layer area meets $Ni:Co:Mn:M=a2:x2:y2:z2$, in which $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, provided that z1 and z2 are not simultaneously zero, and $a1/(a1+x1+y1+z1)>a2/(a2+x2+y2+z2)$; and M comprises at least one selected from Al, Mg, Ti, Ga, Nb, Zr, W, Mo and Ta.

The ternary cathode material of this application has at least one of the following advantages:

1. In the ternary cathode material of the single-crystalline particle structure, the particles are in close contact with each other and the gaps are small, the particles are uniform and the difference of the particle size is small, and the effective contact area between the particles and the binder is larger and the contact is closer. Therefore, the ternary cathode material of the single-crystalline particle structure has a higher structural strength, which can effectively increase the compaction density and upper-limit voltage of the cathode, thereby increasing the energy density of the battery. In addition, a cathode plate prepared with the ternary cathode material experiences no powder falling after being left in the air for a long time, and the processing performance of the electrode is excellent. Moreover, the ternary cathode material of the single-crystalline particle structure can improve the corrosion resistance of the cathode, reduce the side reactions between the cathode and the electrolyte, and solve the problems of high-temperature expansion and expansion upon storage of the battery.

2. The nickel content in the central area of the single-crystalline particle structure is greater than the nickel content in the surface layer area, which can improve the safety performance of the cathode material, while the high energy density of the cathode material is ensured.

3. The ternary cathode material provided in this application is of a micron-sized single-crystalline particle structure. Compared with the existing secondary spherical structure, the single-crystalline particle structure in this application does not have gaps among primary particles. Therefore, the thermal stability of the ternary cathode material is higher, and the phase transition (oxygen evolution reaction) of the high-nickel ternary cathode material in a high lithium deintercalation state is suppressed. The ternary cathode material of the single-crystalline particle structure has good crystallinity, the crystal surface is smooth, the lattice defects are few, the lithium ion conductivity is high, and the rate performance of the battery is also improved.

In this application, the ratio of the molar amount of nickel in the central area to the total molar amount of nickel, cobalt, and manganese in the central area of the single-crystalline particle structure can be 0.85-1.0, for example, 0.9 and 0.95, etc. In this application, the ratio of the molar amount of nickel in the surface layer area to the total molar amount of nickel, cobalt, and manganese in the surface layer area can be 0.3-0.7, for example, 0.4, 0.45, 0.5, 0.55, 0.6, and 0.65, etc.

In this application, the ratio of the molar amount of cobalt in the central area to the total molar amount of nickel, cobalt, and manganese in the central area of the single-crystalline particle structure can be 0.005-0.1, for example, 0.008, 0.01, and 0.12, etc. In this application, the ratio of the molar amount of manganese in the central area to the total molar amount of nickel, cobalt, and manganese in the central area of the single-crystalline particle structure can be 0.005-0.15, for example, 0.008, 0.01, and 0.12, etc. In this application, the ratio of the molar amount of cobalt in the surface layer area to the total molar amount of nickel, cobalt, and manganese in the surface layer area of the single-crystalline particle structure can be 0.2-0.4, for example, 0.25, 0.3, and 0.35, etc. In this application, the ratio of the molar amount of manganese in the surface layer area to the total molar amount of nickel, cobalt, and manganese in the surface layer area of the single-crystalline particle structure can be 0.2-0.4, for example, 0.25, 0.3, and 0.35, etc.

In this application, the median diameter of the single-crystalline particle structure meets $D_{50}=3-20$ μm, for example, the median diameter $D_{50}$ of the single-crystalline particle structure is 5 μm, 8 μm, 10 μm, 12 μm, 15 μm, 17 μm, 18 μm, and 19 μm, etc.

In this application, the average radius of the central area of the single-crystalline particle structure may be 2-18 μm, or 3-14 μm, for example, 5 μm, 8 μm, 10 μm, and 12 μm, etc. In this application, the average thickness of the surface layer area of the single-crystalline particle structure may be 0.5-6 μm, or 1-3 μm, for example, 2 μm, 4 μm, and 5 μm, etc.

In this application, to improve the rate performance of the material, the ternary cathode material may further include a fast ion conductor material coating on the surface of the single-crystalline particle structure. Specifically, the fast ion conductor material may include one or more selected from $Li_2ZrO_3$, $Li_2SnO_3$, $LiNbO_3$, $Li_4Ti_5O_{12}$, and $LiAlO_2$. Thus, by coating the surface of the single-crystalline particle structure with a fast ion conductor material, the rate performance of the ternary cathode material can be improved.

This application also provides a method for preparing a ternary cathode material, which includes the following steps:

formulating a nickel source, a cobalt source, a manganese source, and an M source into a solution A in a first container according to the stoichiometric ratio $Ni:Co:Mn:M=a1:x1:y1:z1$, and formulating the nickel source, the cobalt source, the manganese source and the M source into a solution B in a second container according to the stoichiometric ratio $Ni:Co:Mn:M=a2:x2:y2:z2$, where $0.85 \leq a1 < 1.0$, $0 < x1 \leq 0.1$, $0 < y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, provided that z1 and z2 are not simultaneously zero, and $a1/(a1+x1+y1+z1) > a2/(a2+x2+y2+z2)$; and the M source comprises at least one selected from soluble salts of Al, Mg, Ti, Ga, Nb, Zr, W, Mo, and Ta;

pumping the solution A into a reactor containing an alkali solution and undergoing a first co-precipitation reaction; and after the solution A is completely pumped into the reactor and the first co-precipitation reaction is completed, pumping the solution B into the reactor and undergoing a second co-precipitation reaction to prepare a precursor material;

mixing the precursor material obtained by the second co-precipitation reaction with a lithium salt, pre-sintering, and pulverizing to obtain a first material;

mixing the first material with a flux, subjecting the mixed material to primary sintering, pulverizing, washing to remove the flux, and drying to obtain a second material; and subjecting the second material to secondary sintering, cooling, and pulverization to obtain a ternary cathode material of a single-crystalline particle structure.

This application also provides a method for preparing a ternary cathode material. The ternary cathode material prepared by the method may be the aforementioned ternary cathode material. Therefore, the ternary cathode material prepared by the method has all the features and advantages of the aforementioned ternary cathode material, and will not be repeated here. Specifically, referring to FIG. 5, the method includes the following steps:

S100: Formulate a Solution A and a Solution B Respectively

Figure 5:
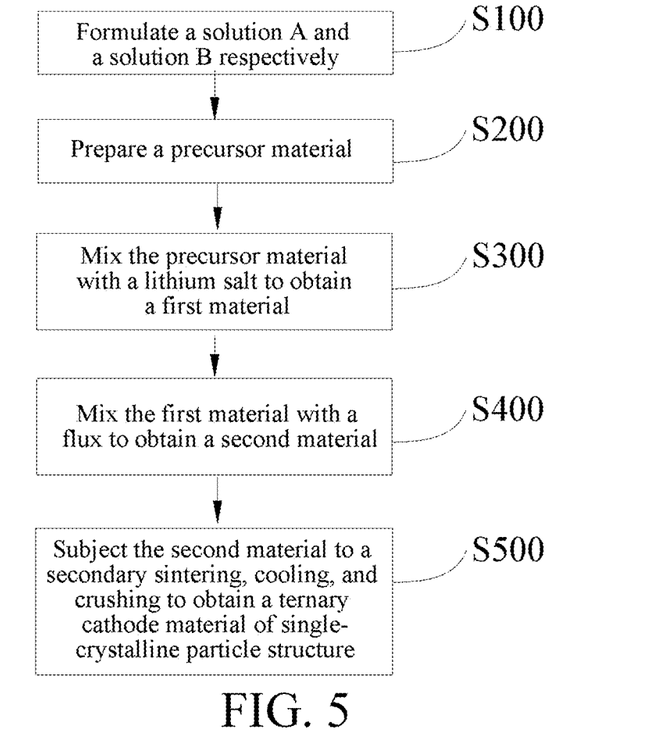
FIG. 5 shows a flow chart of a method for preparing a ternary cathode material according to an embodiment of this application.

In this step, a nickel source, a cobalt source, a manganese source, and an M source are formulated into a solution A in a first container according to the stoichiometric ratio $Ni:Co:Mn:M=a1:x1:y1:z1$, and the nickel source, the cobalt source, the manganese source and the M source are formulated into a solution B in a second container according to the stoichiometric ratio $Ni:Co:Mn:M=a2:x2:y2:z2$, where $0.85 \leq a1 < 1.0$, $0 < x1 \leq 0.1$, $0 < y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, z1 and z2 are not simultaneously zero, and $a1/(a1+x1+y1+z1) > a2/(a2+x2+y2+z2)$; and the M source comprises at least one selected from soluble salts of Al, Mg, Ti, Ga, Nb, Zr, W, Mo, and Ta.

In this application, the nickel source can be various conventional soluble nickel salts in the art. For example, the nickel salt may be at least one of nickel sulfate, nickel nitrate, nickel acetate, and nickel chloride.

In this application, the cobalt source can be various conventional soluble cobalt salts in the art. For example, the cobalt salt may be at least one of cobalt sulfate, cobalt nitrate, cobalt acetate, and cobalt chloride.

In this application, the manganese source can be various conventional soluble manganese salts in the art. For example, the manganese salt may be at least one of manganese sulfate, manganese nitrate, manganese acetate, and manganese chloride.

S200: Prepare a Precursor Material

In this step, the solution A is pumped into a reactor containing an alkali solution and undergoes a first co-precipitation reaction; and after the solution A is completely pumped into the reactor and the first co-precipitation reaction is completed, the solution B is pumped into the reactor containing the alkali solution and undergoes a second co-precipitation reaction to prepare a precursor material.

In this application, by controlling the sequence of the co-precipitation reactions of the solution A and the solution B, a precursor material having a Ni content in the central area that is greater than the nickel content in the surface layer area is prepared in the presence of a co-precipitating agent. Specifically, the mixed solution A containing the nickel source, the cobalt source, the manganese source, and the M source is prepared first, and then the mixed solution B containing the nickel source, the cobalt source, the manganese source, and the M source is prepared, where the molar concentration of nickel in the solution A is greater than the molar concentration of nickel in the solution B. The solution A is pumped into the reactor containing the alkali solution. After the solution A is completely added and the first co-precipitation reaction is completed, the solution B is pumped into the reactor containing the alkali solution, and a second co-precipitation reaction is performed with the precipitation system formed by the solution A as a core, to obtain a ternary cathode material having a nickel content in the central area of the single-crystalline particle structure that is greater than the nickel content in the surface layer area as described above.

In this application, it is also possible to control the rate at which the solution A in the first container is pumped into the reactor containing the alkali solution, and the rate at which the solution B is pumped into the reactor after the addition of the solution A, so as to improve the performance of the ternary cathode material with a core-shell structure having a central area and a surface layer area. In this process, in the precursor material prepared by the co-precipitation reaction, the content of nickel in the central area is greater than that in the surface layer area. Optionally, in this step, the rate of pumping the solution A into the reactor containing the alkali solution can be 1-10 L/h, for example, 1 L/h, 2 L/h, 3 L/h, 4 L/h, 5 L/h, 6 L/h, 7 L/h, 8 L/h, 9 L/h, 10 L/h, and any value in the range delimited by any two of these values. After the solution A is added and the co-precipitation reaction is completed, the rate of pumping the solution B into the reactor is 0.5-8 L/h, for example, 0.5 L/h, 0.8 L/h, 1L/h, 2 L/h, 3 L/h, 4 L/h, 5 L/h, 6 L/h, 7 L/h, 8 L/h, and any value in the range limited by any two of these values.

In this application, in order to achieve the co-precipitation of the solution A and solution B, the aforementioned alkali solution may be an aqueous solution containing a precipitating agent and a complexing agent. Specifically, the precipitating agent may include one or more selected from sodium hydroxide, ammonium bicarbonate, sodium bicarbonate, ammonium oxalate, and sodium oxalate, and the complexing agent may be aqueous ammonia.

Optionally, in this step, the conditions for the co-precipitation reaction may include: a stirring speed in the reactor of 500-1200 rpm, a temperature in the reactor of 30-80° C., and a pH value in the reactor of 8-12.

In this application, in order to fully react the initially precipitated components to obtain a more stable micron-sized primary particle structure of single crystal morphology, the method may further include the steps of aging, centrifuging, washing, and drying the reacted solution sequentially after the second co-precipitation reaction is completed. Specifically, the aging conditions may include: an aging time of 3-24 hrs, and an aging temperature of 30-80° C.

S300: Mix the Precursor Material with a Lithium Salt to Obtain a First Material

In this step, the precursor material obtained in the previous step is mixed with a lithium salt, pre-sintered, and pulverized to obtain a first material. Specifically, the molar ratio of the lithium salt to the precursor material may be (1-1.2):1, for example, 1.00:1, 1.05:1, 1.10:1, 1.15:1, 1.20:1, and any value in the range limited by any two of these values.

In this application, the lithium salt can be various conventional lithium salts in the art. For example, the lithium salt may include at least one of lithium carbonate, lithium hydroxide, lithium nitrate, lithium acetate, lithium fluoride, and lithium phosphate.

In this application, in order to increase the structural strength of the first material, the pre-sintering may include heating up to 400-700° C. at a rate of 2-10° C./min, and sintering for 5-12 hrs.

S400: Mix the First Material with a Flux to Obtain a Second Material

In this step, the first material obtained in the previous step is mixed with a flux, primarily sintered, pulverized, then washed to remove the flux, and dried to obtain a second material.

In this application, in order to reduce the melting point of the first material and better dissolve it in the flux so that the powder particles can well bonded, the weight ratio of the flux to the first material can be (0.2-3):1, for example, 0.20:1, 0.50:1, 1.00:1, 1.50:1, 2.00:1, 2.50:1, 3.00:1, and any value in the range limited by any two of these values.

In this application, the flux may be various conventional fluxes in the art. For example, the flux may include at least one selected from $Li_2CO_3$, LiOH, $Li_2O$, LiF, LiCl, NaCl, NaF, $Na_2O$, $NaBO_2$, $Na_2BO_3$, $Na_2B_4O_7$, $Na_2SO_4$, $K_2SO_4$, KCl, KF, and $B_2O_3$.

In this application, in order to increase the structural strength of the second material, the primary sintering may include heating up to 700-1000° C. at a rate of 2-10° C./min, and sintering for 8-24 hrs.

S500: Subject the second material to a secondary sintering, cooling, and pulverization to obtain a ternary cathode material of single-crystalline particle structure.

In this step, the second material obtained in the previous step is subjected to a secondary sintering, cooled, and pulverized to obtain a ternary cathode material of the single-crystalline particle structure.

In this application, in order to improve the strength, plasticity, and toughness of the prepared ternary cathode material of single-crystalline particle structure, the secondary sintering may include tempering the second material under an oxygen atmosphere, by heating to 650-850° C. at 2-10° C./min, and tempering for 5-24 hrs.

In this application, the median diameter of the material is represented by particle size $D_{50}$, and the particle size $D_{50}$ is the equivalent diameter (average particle size) of the largest particle when the cumulative distribution in the distribution curve is 50%.

In this application, the median diameter of the first material meets $D_{50}$=1-12 μm; the median diameter of the second material meets $D_{50}$=3-20 μm; and the median diameter of the ternary cathode material of the single-crystalline particle structure meets $D_{50}$=3-20 μm. The present application also provides a ternary cathode material, which is prepared by the above-mentioned method.

The present application also provides a lithium ion battery, which comprises a battery cell, an electrolyte, and a battery casing that accommodates the battery cell and the electrolyte. The battery cell comprises a cathode, a separator, and an anode. The cathode comprises a cathode current collector and a cathode material layer located on the surface of the cathode current collector, where the cathode material layer comprises a cathode active material, a conductive agent, and a binder, and the cathode active material may be the ternary cathode material described above.

The present application also provides an electric vehicle, including the lithium ion battery as described above.

The solutions of this application are described below with reference to the examples. A person skilled in the art understands that the following embodiments are only for illustrating this application and are not intended to limit the scope of this application. In the following examples, the test parameters for particle size distribution are measured by a PSA-laser particle size analyzer; and the discharge capacity and cycle retention rate are measured by a charge-discharge tester. Where specific techniques or conditions are not indicated in the examples, the procedures shall be carried out in accordance with the techniques or conditions described in the literatures in the field or in accordance with the product specification.

In the following examples and comparative examples, nickel sulfate, cobalt sulfate, manganese sulfate, aluminum sulfate, magnesium sulfate, molybdenum sulfate, and zirconium sulfate are purchased from Shanghai Aladdin Biochemical Technology Co., Ltd., and nickel acetate, cobalt acetate, manganese acetate, tungsten acetate, and titanium acetate are purchased from Shanghai Aladdin Biochemical Technology Co., Ltd.

EXAMPLE 1

(1) Preparation of a Precursor Material by a Co-Precipitation Method

Nickel sulfate, cobalt sulfate, manganese sulfate, and aluminum sulfate were formulated into 50 L of a 2.0 mol/L solution A according to the stoichiometric ratio of Ni:Co:Mn:Al=9:0.5:0.45:0.05, then nickel sulfate, cobalt sulfate, manganese sulfate, and zirconium sulfate were formulated into 10 L of a 2.0 mol/L solution B according to the stoichiometric ratio of Ni:Co:Mn:Zr=6:2:2:0.05, and a 2.0 mol/L NaOH solution and 2.0 mol/L aqueous ammonia were also formulated.

An appropriate amount of deionized water and aqueous ammonia were added to a reactor, and adjusted to pH value of 11.25. 50 L of the solution A was pumped into the reactor at a pumping rate of 2.5 L/h, and the NaOH solution and aqueous ammonia were also introduced at the same time to maintain the pH value of the reaction solution at 11.25.

When the solution A was completely pumped into the reactor, 10 L of the solution B, the NaOH solution and aqueous ammonia were pumped into the reactor at a pumping rate of 2 L/h. The stirring speed in the reactor was controlled to 800 rpm, the reaction temperature was controlled to 55° C., and the pH value of the reaction solution was maintained at 11.25.

After the reaction materials were pumped, the reaction solution was aged in the reactor for 6 hrs at an aging temperature of 55° C., centrifuged, washed to neutrality, and then dried at 120° C. for 12 hrs to obtain a core-shell structured precursor material of $Ni_{0.85}Co_{0.075}Mn_{0.07}Al_{0.0042}Zr_{0.0008}(OH)_2$. In the precursor material, the content of nickel in the central area of the material is greater than that in the surface layer area.

(2) Preparation of a Ternary Cathode Material by Solid-Phase Sintering

Lithium carbonate was mixed with the prepared precursor material in a blender at a molar ratio of $Li:Ni_{0.85}Co_{0.075}Mn_{0.07}Al_{0.0042}Zr_{0.0008}(OH)_2=1.10:1$. Then the uniformly mixed material was transferred to and baked in a muffle furnace by heating up to 500° C. at 5° C./min and sintering for 10 hrs. After cooling with the furnace, the sintered material was ground and pulverized and then passed through a 300-mesh sieve to screen out large and irregular particles, so as to obtain a first material.

The flux NaCl was uniformly mixed with the prepared first material in a blender at a weight ratio of NaCl:first material =2:1, and then transferred to and baked in a muffle furnace by heating up to 950° C. at 5° C./min and sintering for 20 hrs. The furnace temperature was controlled to slowly drop to 600° C. at 2° C./min, and then the material was cooled with the furnace. The sintered material was ground and pulverized and then passed through a 200-mesh sieve to screen out large and irregular particles. The flux NaCl was removed by washing with pure water at 50° C. and then the material was dried at 120° C. for 12 hrs so as to obtain a second material.

The obtained second material was tempered in a muffle furnace at a high temperature by introducing oxygen, heating up to 700° C. at 2° C./min, and annealing for 10 hrs. After cooling with the furnace, the sintered material was ground and pulverized and then passed through a 400-mesh sieve to screen out large and irregular particles, so as to obtain a ternary cathode material.

The particle size distribution of the prepared ternary cathode material was measured by a PSA-laser particle size analyzer, and the measured median diameter $D_{50}$ is 12.8 μm.

EXAMPLE 2

(1) Preparation of a Precursor Material by a Co-Precipitation Method

The preparation method of the precursor material was the same as that in Example 1.

(2) Preparation of a Ternary Cathode Material by Solid-Phase Sintering

Lithium carbonate and lithium fluoride (where the content of lithium fluoride was 5 wt% based on the total weight of the lithium salt) were mixed with the prepared precursor material in a blender at a molar ratio of $Li:Ni_{0.85}Co_{0.075}Mn_{0.07}Al_{0.0042}Zr_{0.0008}(OH)_2=1.15:1$. Then the uniformly mixed material was transferred to and baked in a muffle furnace by heating up to 700° C. at 5° C./min and sintering for 10 hrs. After cooling with the furnace, the material was ground and pulverized and then passed through a 300-mesh sieve to screen out large and irregular particles, so as to obtain a first material.

The flux KCl was uniformly mixed with the prepared first material in a blender at a weight ratio of KCl:first material=0.5:1, and then transferred to and baked in a muffle furnace by heating up to 850° C. at 5° C./min and sintering for 20 hrs. The furnace temperature was controlled to slowly drop to 600° C. at 2° C./min, and then the material was cooled with the furnace. The sintered material was ground and pulverized and then passed through a 200-mesh sieve to screen out large and irregular particles. The flux was removed by washing with pure water at 50° C. and then the material was dried at 120° C. for 12 hrs so as to obtain a second material.

The obtained second material was tempered in a muffle furnace at a high temperature by introducing air, heating up to 800° C. at 2° C./min, and annealing for 18 hrs. After cooling with the furnace, the sintered material was ground and pulverized and then passed through a 400-mesh sieve to screen out large and irregular particles, so as to obtain a ternary cathode material.

The particle size distribution of the prepared ternary cathode material was measured by a PSA-laser particle size analyzer, and the measured median diameter $D_{50}$ is 8.6 μm.

EXAMPLE 3

(1) Preparation of a Precursor Material by a Co-Precipitation Method

Nickel sulfate, cobalt sulfate, manganese sulfate, and magnesium sulfate were formulated into 20 L of a 2.0 mol/L solution A according to the stoichiometric ratio of Ni:Co:Mn: Mg=8.95:0.5:0.5:0.05, then nickel sulfate, cobalt sulfate, manganese sulfate, and aluminum sulfate were formulated into 2 L of a 2.0 mol/L solution B according to the stoichiometric ratio of Ni:Co:Mn:Al =6:2:2:0.1, and a 2.0 mol/L sodium hydroxide solution and aqueous ammonia were also formulated.

An appropriate amount of deionized water and aqueous ammonia were added to a reactor, and adjusted to pH 11.0. 20 L of the solution A was pumped into the reactor at a pumping rate of 2 L/h, and an ammonium bicarbonate solution and aqueous ammonia were also introduced at the same time to maintain the pH of the reaction solution at 11.0.

When the solution A was completely pumped into the reactor, 2 L of the solution B was pumped into the reactor at a pumping rate of 0.5 L/h. The stirring speed in the reactor was controlled to 1000 rpm, the reaction temperature was controlled to 30° C., and the pH of the reaction solution was maintained at 11.0.

After the reaction materials were pumped, the reaction solution was aged in the reactor for 5 hrs at an aging temperature of 30° C., centrifuged, washed to neutrality, and then dried at 120° C. for 12 hrs to obtain a core-shell structured precursor material of $Ni_{0.868}Co_{0.064}Mn_{0.063}Mg_{0.004}Al_{0.001}CO_3$. In the precursor material, the content of nickel in the central area of the material is greater than that in the surface layer area.

(2) Preparation of a Ternary Cathode Material by Solid-Phase Sintering

Lithium carbonate and the prepared precursor material were weighed and mixed in a blender at a molar ratio of $Li:Ni_{0.868}Co_{0.064}Mn_{0.063}Mg_{0.004}Al_{0.001}CO_3=1.10:1$. Then the uniformly mixed material was transferred to and baked in a muffle furnace by heating up to 700° C. at 3° C./min and sintering for 12 hrs. After cooling with the furnace, the material was ground and pulverized and then passed through a 300-mesh sieve to screen out large and irregular particles, so as to obtain a first material.

The fluxes NaCl and NaF (at a weight ratio of 1:1) were uniformly mixed with the prepared first material in a blender at a weight ratio of NaCl+NaF:first material=1:1, and then transferred to and baked in a muffle furnace by heating up to 850° C. at 5 ° C./min and sintering for 20 hrs. The furnace temperature was controlled to slowly drop to 600° C. at 2°

C./min, and then the material was cooled with the furnace. The sintered material was ground and pulverized and then passed through a 200-mesh sieve to screen out large and irregular particles. The flux was removed by washing with pure water at 50° C. and then the material was dried at 120° C. for 12 hrs so as to obtain a second material.

The obtained second material was tempered in a muffle furnace at a high temperature by introducing air, heating up to 800° C. at 2° C./min, and annealing for 10 hrs. After cooling with the furnace, the sintered material was ground and pulverized and then passed through a 400-mesh sieve to screen out large and irregular particles, so as to obtain a ternary cathode material.

The particle size distribution of the prepared ternary cathode material was measured by a PSA-laser particle size analyzer, and the measured median diameter $D_{50}$ is 7.5 μm.

EXAMPLE 4

(1) Preparation of a Precursor Material by a Co-Precipitation Method

Nickel sulfate, cobalt sulfate, manganese sulfate and molybdenum sulfate were formulated into 40 L of a 2.0 mol/L solution A according to the stoichiometric ratio of Ni:Co:Mn:Mo=9:0.42:0.5:0.08, then nickel sulfate, cobalt sulfate, and manganese sulfate were formulated into 20 L of a 2.0 mol/L solution B according to the stoichiometric ratio of Ni:Co:Mn=6:2:2, and a 2.0 mol/L NaOH solution and 4.0 mol/L aqueous ammonia were also formulated.

An appropriate amount of deionized water, the NaOH solution, and aqueous ammonia were added to a reactor, and adjusted to pH value of 11.5. 40 L of the solution A was pumped into the reactor at a pumping rate of 3 L/h, and the NaOH solution and aqueous ammonia were also introduced at the same time. When the solution A was completely pumped into the reactor, 20 L of the solution B, the NaOH solution and aqueous ammonia were pumped into the reactor at a pumping rate of 2 L/h. The pH value of the reaction solution was maintained at 11.5, the stirring speed in the reactor was controlled to 800 rpm, the reaction temperature was controlled to 55° C., and the pH value of the reaction solution was maintained at 11.5.

After the reaction materials were pumped, the reaction solution was aged in the reactor for 6 hrs at an aging temperature of 55° C., centrifuged, washed to neutrality, and then dried at 120° C. for 12 hrs to obtain a core-shell structured precursor material of $Ni_{0.8}Co_{0.095}Mn_{0.1}Mo_{0.005}(OH)_2$. In the precursor material, the content of nickel in the central area of the material is greater than that in the surface layer area.

(2) Preparation of a Ternary Cathode Material by Solid-Phase Sintering

Lithium carbonate and the prepared precursor material were weighed and mixed in a blender at a molar ratio of $Li:Ni_{0.8}Co_{0.095}Mn_{0.1}Mo_{0.008}(OH)_2=1.10:1$. Then the uniformly mixed material was transferred to and baked in a muffle furnace by heating up to 600° C. at 2° C./min and sintering for 10 hrs. After cooling with the furnace, the material was ground and pulverized and then passed through a 300-mesh sieve to screen out large and irregular particles, so as to obtain a first material.

The flux NaCl was uniformly mixed with the prepared first material in a blender at a weight ratio of NaCl:first material=2:1, and then transferred to and baked in a muffle furnace by heating up to 850° C. at 5° C./min and sintering for 20 hrs. The furnace temperature was controlled to slowly drop to 600° C. at 2° C./min, and then the material was cooled with the furnace. The sintered material was ground and pulverized and then passed through a 200-mesh sieve to screen out large and irregular particles. The flux was removed by washing with pure water at 50° C. and then the material was dried at 120° C. for 12 hrs so as to obtain a second material.

The obtained second material was tempered in a muffle furnace at a high temperature by introducing air, heating up to 800° C. at 2° C./min, and annealing for 15 hrs. After cooling with the furnace, the sintered material was ground and pulverized and then passed through a 400-mesh sieve to screen out large and irregular particles, so as to obtain a ternary cathode material.

The particle size distribution of the prepared ternary cathode material was measured by a PSA-laser particle size analyzer, and the measured median diameter $D_{50}$ is 5.0 μm.

EXAMPLE 5

(1) Preparation of a Precursor Material by a Co-Precipitation Method

The cathode material was prepared following the method of Example 4, except that nickel acetate, cobalt acetate, manganese acetate, and tungsten acetate were formulated into 40 L of a 2.0 M solution A according to the stoichiometric ratio of Ni:Co:Mn:W=8.8:0.4:0.5:0.1, and then nickel acetate, cobalt acetate, manganese acetate, and titanium acetate were formulated into 20 L of a 2.0 M solution B according to the stoichiometric ratio of Ni:Co:Mn:Ti=5:2:2.5:0.5.

(2) The Ternary Cathode Material was Prepared by Solid-Phase Sintering as Described in Example 4.

EXAMPLE 6

(1) Preparation of a Precursor Material by a Co-Precipitation Method

Nickel sulfate, cobalt sulfate, manganese sulfate and molybdenum sulfate were formulated into 20 L of a 2.0 mol/L solution A according to the stoichiometric ratio of Ni:Co:Mn:Mo=8.5:0.5:0.8:0.2, then were formulated into 5 L of a 2.0 mol/L solution B according to the stoichiometric ratio of Ni:Co:Mn=6:2:2, and a 2.0 mol/L $Na_2CO_3$ solution and 1 mol/L aqueous ammonia were also formulated.

An appropriate amount of deionized water and aqueous ammonia solution were added to a reactor, and adjusted to pH to 8.0. The solution A was pumped into the reactor at a pumping rate of 2 L/h, and the prepared $Na_2CO_3$ solution and aqueous ammonia were also introduced at the same time, to maintain the pH value of the reaction solution at 8.0. When the solution A was completely pumped into the reactor, the solution B was pumped into the reactor at a pumping rate of 1 L/h. The stirring speed in the reactor was controlled to 1000 rpm, the reaction temperature was controlled to 50° C., and the pH value of the reaction solution was maintained at 8.0

After the reaction materials were pumped, the reaction solution was aged in the reactor for 8 hrs at an aging temperature of 60° C., centrifuged, washed to neutrality, and then dried at 120° C. for 12 hrs to obtain a precursor material. In the precursor material, the content of nickel in the central area of the material is greater than that in the surface layer area.

(2) The Ternary Cathode Material was Prepared by Solid-Phase Sintering as Described in Example 3, Except that the Flux was $Na_2SO_4$ and LiF(4:1).

The particle size distribution of the prepared ternary cathode material was measured by a PSA-laser particle size analyzer, and the measured median diameter D50 is 7.0 μm.

EXAMPLE 7

(1) Preparation of a Precursor Material by a Co-Precipitation Method

Nickel sulfate, cobalt sulfate, manganese sulfate, and aluminum sulfate were formulated into 20 L of a 2.0 mol/L solution A according to the stoichiometric ratio of Ni:Co:Mn:Al=9:0.5:0.4:0.1, then were formulated into 20 L of a 2.0 mol/L solution B according to the stoichiometric ratio of Ni:Co:Mn=4:2:4, and a 3 mol/L $Na_2C_2O_4$ solution and 1 mol/L aqueous ammonia were also formulated.

An appropriate amount of deionized water and aqueous ammonia were added to the reactor, and adjusted to pH value of 9.0. The solution A was pumped into the reactor at a pumping rate of 2 L/h, and the formulated Na2C2O4 solution and aqueous ammonia were also introduced at the same time to maintain the pH value of the reaction solution at 8.0. When the solution A was completely pumped into the reactor, the solution B was pumped into the reactor at a pumping rate of 1 L/h. The stirring speed in the reactor was controlled to 1000 rpm, the reaction temperature was controlled to 45° C., and the pH value of the reaction solution was maintained at 9.0.

After the reaction materials were pumped, the reaction solution was aged in the reactor for 8 hrs at an aging temperature of 45° C., centrifuged, washed to neutrality, and then dried at 120° C. for 12 hrs to obtain a precursor material of $Ni_{0.8}Co_{0.1}Mn_{0.093}Al_{0.007}$ or $C_2O_4$. In the precursor material, the content of nickel in the central area of the material is greater than that in the surface layer area.

(2) The Ternary Cathode Material was Prepared by Solid-Phase Sintering as Described in Example 4.

The particle size distribution of the prepared ternary cathode material was measured by a PSA-laser particle size analyzer, and the measured median diameter $D_{50}$ is 4.2 μm.

COMPARATIVE EXAMPLE 1

(1) Preparation of a Precursor Material by a Co-Precipitation Method

The precursor material was prepared following the method of Example 4, except that after the solution A was added, the step of pumping the solution B into the reactor and undergoing a co-precipitation reaction was omitted, and no molybdenum sulfate was added in the solution A.

(2) Preparation of a Ternary Cathode Material by Solid-Phase Sintering

The preparation method of the ternary cathode material was the same as that in Example 4.

COMPARATIVE EXAMPLE 2

(1) Preparation of a Precursor Material by a Co-Precipitation Method

The preparation method of the precursor material was the same as that in Comparative Example 1.

(2) Preparation of a Ternary Cathode Material by Solid-Phase Sintering

The ternary cathode material was prepared as described in Example 4, except that the step of preparing the second material was omitted.

COMPARATIVE EXAMPLE 3

(1) Preparation of a Precursor Material by a Co-Precipitation Method

The preparation method of the precursor material was the same as that in Example 4, except that the solution A and the solution B were directly mixed, where the molar concentration of nickel in the mixed solution was a fixed value, and the content of Ni, Co, and Mn in the prepared precursor was kept unchanged.

(2) Preparation of a Ternary Cathode Material by Solid-Phase Sintering

The cathode material was prepared following the method in Example 4.

TEST EXAMPLE

1. Characterization of Material

Figure 1:
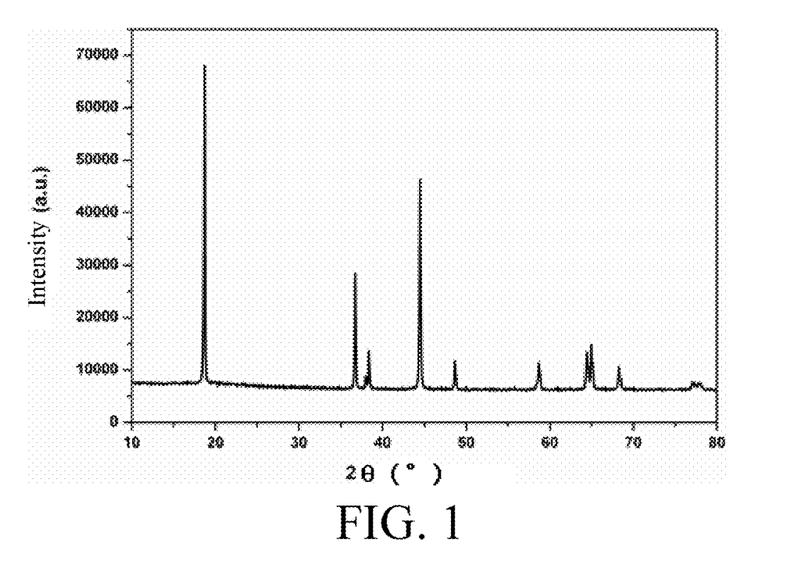
FIG. 1 is an XRD pattern of a ternary cathode material prepared in Example 1.

The ternary cathode material prepared in Example 1 was analyzed by RigakuSmartLab X-ray diffractometer. Working conditions are: tube voltage 40 kV, tube current 20 mA, Cu Ka radiation, λ=0.154056 nm, graphite monochromator, step width 0.02°, and residence time 0.2s. The result of Example 1 is shown in FIG. 1. From the test results by XRD in FIG. 1, it can be seen that the ternary cathode material prepared in Example 1 is an R-3m layered material comprising no other impurities.

Figure 2:
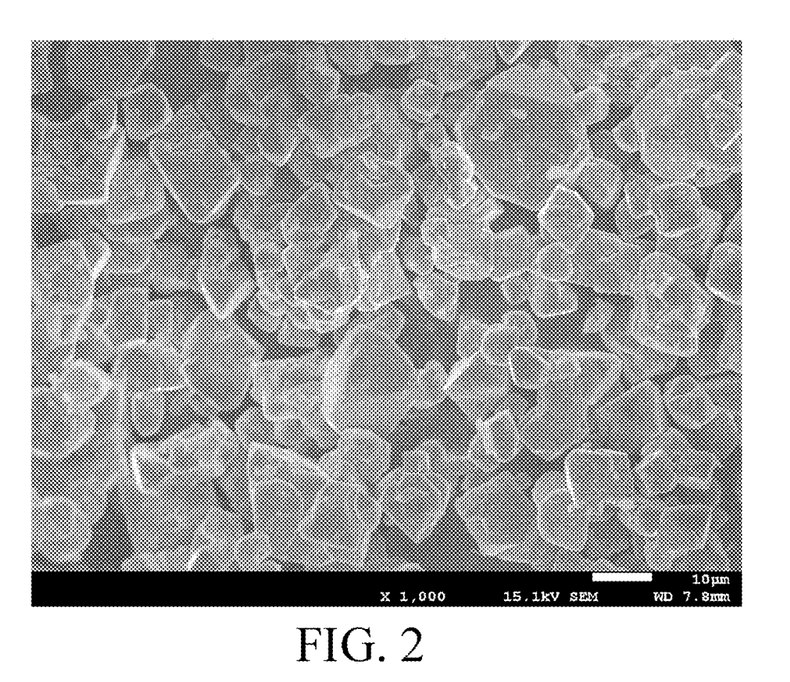
FIG. 2 is an SEM image of the ternary cathode material prepared in Example 1.

The morphology of the ternary cathode material prepared in Example 1 was observed on the JSM-7600F field emission scanning electron microscope from JEOL, Japan. The result of Example 1 is shown in FIG. 2. From the morphology observed by SEM in FIG. 2, it can be seen that the ternary cathode material prepared in Example 1 is of a single-crystalline particle structure, and not secondary spheres agglomerated by primary particles. The results of other examples are similar, and not shown herein.

Figure 3:
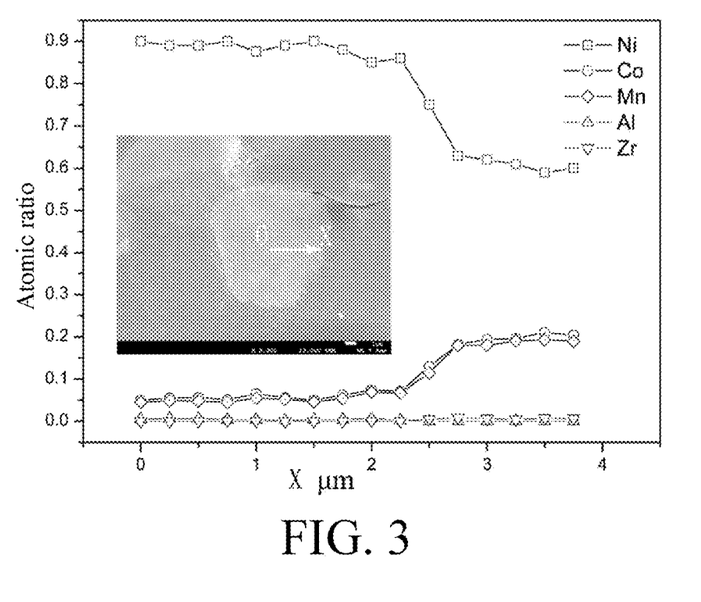
FIG. 3 is a cross-sectional view and a composition distribution diagram by line scan EDS of the ternary cathode material prepared in Example 1.

The composition distribution of the ternary cathode material prepared in Example 1 was determined by line scan EDS as follows. The prepared cathode material was dispersed in an epoxy resin sol, solidified, and then prepared into cross-sectional samples of particles. The morphology of the cross section of the particles was observed by SEM, and the composition distribution of particles in a specified direction was determined by line can ED. The results are shown in FIG. 3. From the composition distribution results by line scan EDS in FIG. 3, it can be seen that the primary particle structure in the ternary cathode material prepared in Example 1 has a relatively smooth cross section, and is a single-crystalline particle structure. From the composition distribution by line scan EDS, it can also be seen that the content of nickel in the central area of the single-crystalline particle structure is greater than that in the surface layer. The results of other examples are similar, and not shown herein.

The particle size distributions of the first material, the second material, and the ternary cathode material prepared in Example 1 were tested by the PSA-laser particle size analyzer, and the dispersant and the dispersion medium were both anhydrous ethanol. The particle size test results show that the median diameter of the ternary cathode material prepared in Example 1-6 meets $D_{50}$=3-20 μm, the median diameter of the first material meets $D_{50}$=1-12 μm, and the median diameter of the second material meets $D_{50}$=3-20 μm.

2. Electrochemical Test

The ternary cathode material prepared by sintering in Examples 1-6 and Comparative Examples 1-3, the conductive carbon (Super P), and the binder polyvinylidene fluoride (PVDF) were mixed uniformly at a weight ratio of 90:5:5, and fully dispersed evenly in NMP as a solvent. The resulting slurry was coated on an aluminum foil, and dried at 100° C. for 12 hrs under vacuum to prepare a cathode plate.

The metal lithium plate was used as a counter electrode, the cathode plate coated on the aluminum foil was used as a working electrode, and the electrolyte was 1 mol/L $LiPF_6$ in EC:EMC:DEC (40:40:20 w/w/w), with which a CR2016 button cell was assembled in a glove box (water content <1 ppm, and oxygen content <1 ppm). The cells prepared in Example 1-Example 7 were subject to a first cycle of charge and discharge at a rate of 0.1C at a temperature of 25° C. in a voltage range of 2.75-4.3V, and the first charge capacity and discharge capacity were recorded. The first discharge efficiency (%) was calculated. Then 100 cycles of charge and discharge were carried out at a rate of 0.5C, and the capacity retention rate (%) after the cycles were calculated. The test results are shown in Table 1.

TABLE 1

| | First discharge capacity at 0.1 C (mAh/g) | First discharge efficiency at 0.1 C (%) | Cycle capacity retention rate at 0.5 C (%) |
|---|---|---|---|
| Example 1 | 196.2 | 89.8 | 93.2 |
| Example 2 | 190.4 | 88.8 | 90.9 |
| Example 3 | 190.9 | 87.9 | 91.5 |
| Example 4 | 193.5 | 87.3 | 92.0 |
| Example 5 | 194.6 | 85.9 | 92.3 |
| Example 6 | 190.8 | 88.1 | 91.1 |
| Example 7 | 192.7 | 86.5 | 90.0 |
| Comparative Example 1 | 181.8 | 83.3 | 80.5 |
| Comparative Example 2 | 180.5 | 83.2 | 81.5 |
| Comparative Example 3 | 181.1 | 83.1 | 83.1 |

Figure 4:
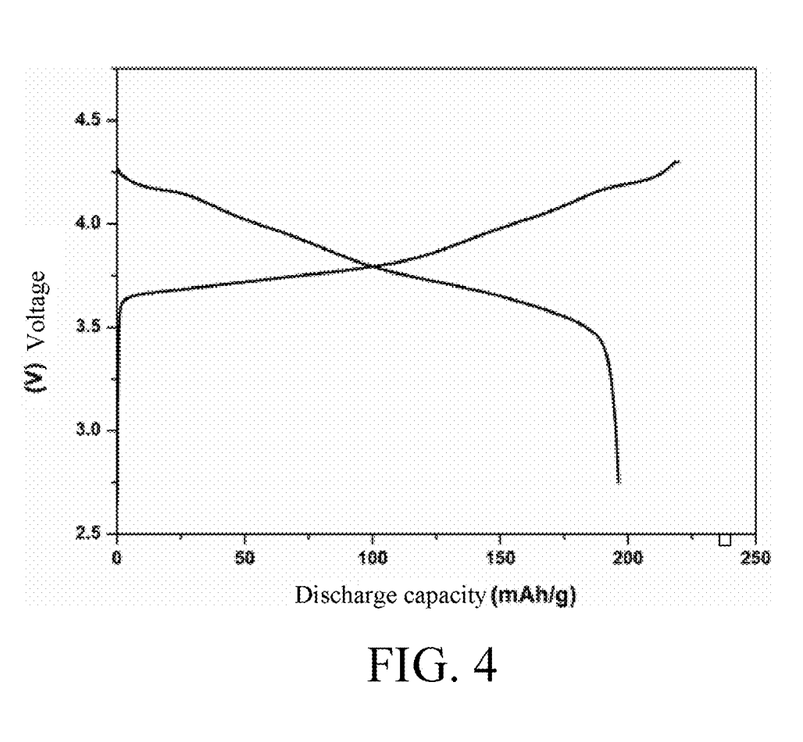
FIG. 4 is a charge and discharge curve of the ternary cathode material prepared in Example 1.

From the results in Table 1 and FIG. 4, it can be seen that the discharge capacity of the ternary cathode materials prepared in Examples 1-6 is greater than 190 mAh/g, the first discharge efficiency is greater than 85.9%, and the cycle capacity retention rate is maintained at 90% or more, which are significantly better than those of the cathode materials prepared in Comparative Examples 1-3.

The implementations of this application are described in detail above. However, this application is not limited to specific details in the foregoing implementations. Within the scope of the technical idea of this application, a plurality of simple variances may be performed on the technical solutions of this application, and these simple variances all fall within the protection scope of this application.

It should be further noted that the specific technical features described in the above specific embodiments may be combined in any suitable manner without contradiction. In addition, various different implementations of this application may also be combined randomly. The combinations should also be regarded as the disclosure of this application as long as the combinations do not violate the idea of this application.

What is claimed is:

1. A ternary cathode material, comprising a $LiNi_{1-x-y-z}Co_xMn_yM_zO_2$ with a micron-sized single-crystalline particle structure, wherein $0.6 \leq 1-x-y-z<1.0$, $0<x<0.2$, $0<y<0.3$, and $0<z<0.1$; the single-crystalline particle structure comprises a central portion and a surface layer portion, wherein a first molar ratio of elements in the central portion meets Ni:Co:Mn:M=a1:x1:y1:z1, and a second molar ratio of elements in the surface layer portion meets Ni:Co:Mn:M=a2:x2:y2:z2, wherein $0.85 \leq a1<1.0$, $0<x1<0.1$, $0<y1 \leq 0.15$, $0 \leq z1 \leq 0.05$, $0.3 \leq a2 \leq 0.7$, $0.2 \leq x2$, $y2 \leq 0.4$, and $0 \leq z2 \leq 0.05$, z1 and z2 are not simultaneously zero, and $a1/(a1+x1+y1+z1)>a2/(a2+x2+y2+z2)$; and M comprises at least one selected from Al, Mg, Ti, Ga, Nb, Zr, W, Mo and Ta.

2. The ternary cathode material according to claim 1, wherein a ratio of a molar amount of nickel in the central portion to a total molar amount of nickel, cobalt, and manganese in the central portion is 0.85-1.0, and a ratio of a molar amount of nickel in the surface layer portion to a total molar amount of nickel, cobalt, and manganese in the surface layer portion is 0.3-0.7.

3. The ternary cathode material according to claim 1, wherein a ratio of a molar amount of cobalt in the central portion to a total molar amount of nickel, cobalt, and manganese in the central portion is 0.005-0.1, and a ratio of a molar amount of manganese in the central portion to the total molar amount of nickel, cobalt, and manganese in the central portion is 0.005-0.15; and a ratio of a molar amount of cobalt in the surface layer portion to a total molar amount of nickel, cobalt, and manganese in the surface layer portion is 0.2-0.4, and a ratio of a molar amount of manganese in the surface layer portion to the total molar amount of nickel, cobalt, and manganese in the surface layer portion is 0.2-0.4.

4. The ternary cathode material according to claim 1, wherein a median diameter of the single-crystalline particle structure is 3-20 μm.

5. The ternary cathode material according to claim 1, wherein an average radius of the central portion of the single-crystalline particle structure is 2-18 μm, and an average thickness of the surface layer portion is 0.5-6 μm.

6. The ternary cathode material according to claim 1, further comprising a fast ion conductor material coating on a surface of the single-crystalline particle structure.

7. The ternary cathode material according to claim 6, wherein a material for forming the fast ion conductor material coating comprises one or more selected from $Li_2ZrO_3$, $Li_2SnO_3$, $LiNbO_3$, $Li_4Ti_5O_{12}$, and $LiAlO_2$.

8. A method for preparing a ternary cathode material, comprising:

formulating a nickel source, a cobalt source, a manganese source, and an M source into a solution A in a first container according to a stoichiometric ratio Ni:Co:Mn:M=a1:x1:y1:z1, and formulating the nickel source, the cobalt source, the manganese source, and the M source into a solution B in a second container according to a second stoichiometric ratio Ni:Co:Mn:M=a2:x2:y2:z2, wherein $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2,y2 \leq 0.4$, and $0 \leq z2 \leq 0.05$, z1 and z2 are not simultaneously zero, and $a1/(a1+x1+y1+z1)>a2/(a2+x2+y2+z2)$; and the M source is at least one selected from soluble salts of Al, Mg, Ti, Ga, Nb, Zr, W, Mo, and Ta;

pumping the solution A into a reactor containing an alkaline solution and undergoing a first co-precipitation reaction; and after the first co-precipitation reaction is completed, pumping the solution B into the reactor containing the alkaline solution and undergoing a second co-precipitation reaction to prepare a precursor material;

mixing the precursor material with a lithium salt to obtain a first mixture, pre-sintering and pulverizing the firs mixture to obtain a first material;

mixing the first material with a flux to obtain a second mixture, primary sintering, pulverizing, and washing the second mixture to remove the flux, and drying to obtain a second material; and secondary sintering, cooling, and pulverizing the second material to obtain a ternary cathode material of a single-crystalline particle structure.

9. The method for preparing a ternary cathode material according to claim 8, wherein the nickel source comprises at least one of nickel sulfate, nickel nitrate, nickel acetate, and nickel chloride; the cobalt source comprises at least one of cobalt sulfate, cobalt nitrate, cobalt acetate, and cobalt chloride; the manganese source comprises at least one of manganese sulfate, manganese nitrate, manganese acetate, and manganese chloride; the lithium salt comprises at least one of lithium carbonate, lithium hydroxide, lithium nitrate, lithium acetate, lithium fluoride, and lithium phosphate; and the flux comprises at least one of $Li_2CO_3$, LiOH, $Li_2O$, LiF, LiCl, NaCl, NaF, $Na_2O$, $NaBO_2$, $Na_2BO_3$, $Na_2B_4O_7$, $Na_2SO_4$, $K_2SO_4$, KCl, KF, and $B_2O_3$.

10. The method for preparing a ternary cathode material according to claim 8, wherein a rate of pumping the solution A into the reactor containing the alkaline solution is 1-10 L/h, and a rate of pumping the solution B into the reactor containing the alkaline solution is 0.5-8 L/h.

11. The method for preparing a ternary cathode material according to claim 8, wherein the alkaline solution comprises an aqueous solution containing a co-precipitating agent and a complexing agent, the co-precipitating agent comprises one or more selected from sodium hydroxide, ammonium bicarbonate, sodium bicarbonate, ammonium oxalate, and sodium oxalate, and the complexing agent comprises aqueous ammonia.

12. The method for preparing a ternary cathode material according to claim 8, wherein conditions for a co-precipitation reaction comprise: a stirring speed in the reactor containing the alkaline solution controlled to 500-1200 rpm, a temperature in the reactor containing the alkaline solution controlled to 40-80° C., and a pH value in the reactor containing the alkaline solution controlled to 8-12.

13. The method for preparing a ternary cathode material according to claim 12, after the second co-precipitation reaction is completed, further comprising: aging, centrifuging, washing, and drying a reacted solution sequentially; wherein aging conditions comprise an aging time of 3-24 hrs, and an aging temperature of 40-80° C.

14. The method for preparing a ternary cathode material according to claim 8, wherein a molar ratio of the lithium salt to the precursor material is (1-1.2):1.

15. The method for preparing a ternary cathode material according to claim 8, wherein the pre-sintering comprises increasing a temperature to 400-700° C. at a rate of 2-10° C./min, and holding the temperature for 5-12 hrs.

16. The method for preparing a ternary cathode material according to claim 8, wherein a weight ratio of the flux to the first material is (0.2-3):1.

17. The method for preparing a ternary cathode material according to claim 8, wherein the primary sintering comprises increasing a temperature to 700-1000° C. at a rate of 2-10° C./min, and holding the temperature for 8-24 hrs.

18. The method for preparing a ternary cathode material according to claim 8, wherein the secondary sintering comprises tempering the second material under an oxygen atmosphere, by heating up to 650-850° C. at 2-10° C./min, and tempering for 5-24 hrs.

19. The method for preparing a ternary cathode material according to claim 8, wherein a median diameter of the first material is 1-12 μm; a median diameter of the second material is 3-20 μm; and a median diameter of the ternary cathode material of the single-crystalline particle structure is 3-20 μm.

20. A lithium ion battery, comprising a battery cell, an electrolyte, and a battery casing that accommodates the battery cell and the electrolyte, wherein the battery cell comprises a cathode, a separator, and an anode, the cathode comprises a cathode current collector and a cathode material layer located on a surface of the cathode current collector, and the cathode material layer comprises a cathode active material, a conductive agent, and a binder, and wherein the cathode active material comprises a $LiNi_{1-x-y-z}Co_xMn_yM_zO_2$ with a micron-sized single-crystalline particle structure, wherein $0.6 \leq 1-x-y-z<1.0$, $0<x<0.2$, $0<y<0.3$, and $0<z<0.1$; the single-crystalline particle structure comprises a central portion and a surface layer portion, wherein a first molar ratio of elements in the central portion meets Ni:Co:Mn:M=a1:x1:y1:z1, and a second molar ratio of elements in the surface layer portion meets Ni:Co:Mn:M=a2:x2:y2:z2, wherein $0.85 \leq a1<1.0$, $0<x1 \leq 0.1$, $0<y1 \leq 0.15$, $0 \leq z1 \leq 0.05$, $0.3 \leq a2 \leq 0.7$, $0.2 \leq x2, y2 \leq 0.4$, and $0 \leq z2 \leq 0.05$, wherein z1 and z2 are not simultaneously zero, and $a1/(a1+x1+y1+z1)>a2/(a2+x2+y2+z2)$; and M comprises at least one selected from Al, Mg, Ti, Ga, Nb, Zr, W, Mo and Ta.

* * * * *

UNITED STATES PATENT AND TRADEMARK OFFICE
CERTIFICATE OF CORRECTION

PATENT NO. : 11,996,555 B2  
APPLICATION NO. : 17/272177  
DATED : May 28, 2024  
INVENTOR(S) : Yongqing Gan et al.

Page 1 of 1

It is certified that error appears in the above-identified patent and that said Letters Patent is hereby corrected as shown below:

In the Specification

Column 13, Line 3, that reads "diameter D50 is 7.0μm." should read -- diameter $D_{50}$ is 7.0μm. --

Column 14, Line 22, that reads "Cu Ka radiation," should read -- Cu Kα radiation --

In the Claims

Column 16, Claim 1, Line 1, that reads "wherein 0.85≤a1<1.0, 0<x1<0.1" should read -- wherein 0.85≤a1<1.0, 0<x1≤0.1 --

Signed and Sealed this  
Tenth Day of December, 2024

Katherine Kelly Vidal  
*Director of the United States Patent and Trademark Office*